(No Model.)  J. P. SIMMONS.  2 Sheets—Sheet 1.
CUT-OFF VALVE.

No. 337,025.  Patented Mar. 2, 1886.

Witnesses,
Geo. H. Strong.
J. H. Towne.

Inventor,
John P. Simmons
By Dewey & Co.
Attorneys (No Model.) 2 Sheets—Sheet 2.

J. P. SIMMONS.
CUT-OFF VALVE.

No. 337,025. Patented Mar. 2, 1886.

Witnesses,
Geo. H. Strong.
J. H. Trouse

Inventor,
John P. Simmons
By
Dewey & Co.
Attorneys

UNITED STATES PATENT OFFICE.

JOHN P. SIMMONS, OF SAN FRANCISCO, CALIFORNIA.

CUT-OFF VALVE.

SPECIFICATION forming part of Letters Patent No. 337,025, dated March 2, 1886.

Application filed July 7, 1885. Serial No. 170,922. (No model.)

*To all whom it may concern:*

Be it known that I, JOHN P. SIMMONS, of the city and county of San Francisco, State of California, have invented an Improvement in Engine Cut-Off Valves; and I hereby declare the following to be a full, clear, and exact description of the same.

My invention relates to certain improvements in valves for engines, and it is especially applicable to valves such as are shown in my patent of September, 1884.

It consists of a tapering main valve with a cut-off valve of the same shape inside of it, having an inlet upon one side of the casing, within which it oscillates, and steam and exhaust ports on the opposite side. These valves are closed at both ends, and have trunnions at the larger ends, and valve-stems extending outward from the smaller end, and cranks or eccentrics by which they are operated. In combination with these I employ a packing to provide a steam-tight joint between the neck of the inlet-passage and the main valve, and prevent the unseating of the valves by allowing steam to pass through openings in the trunnions into a recess at the ends, this pressure being sufficient to prevent the valves leaving their seats on account of the taper.

Figure 1:
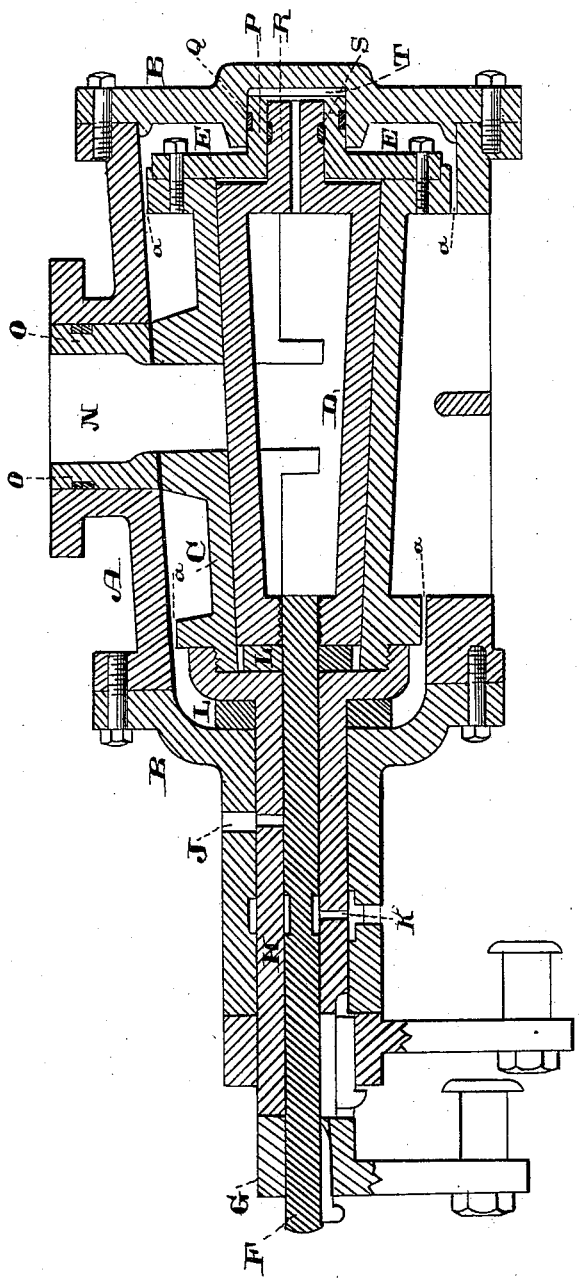
Figure 2:
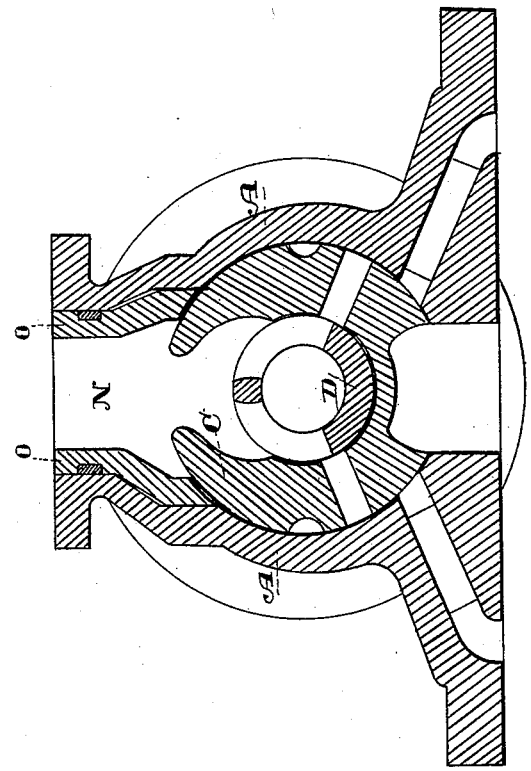

Referring to the accompanying drawings for a more complete explanation of my invention, Figure 1 is a longitudinal vertical section taken through the valves, valve-casing, and packing. Fig. 2 is a transverse vertical section taken through the valves and ports.

A is the exterior casing within which the valves work, having removable heads B at each end.

C is the main and D the cut-off valve. The valve C rotates within the casing, being made conical to correspond in shape with the interior of the casing. The valve D is also conical, and fits within the exterior valve, C, which is bored true to receive it, and has a head, E, bolted upon its larger end, which may be removed to admit the inner or cut-off valve, after which it is replaced. From the smaller end of the cut-off valve a stem, F, extends outwardly, and has a rocker-arm, G, keyed to it, this rocker-arm being connected with a crank or eccentric, by which it is given a vibrating or oscillating motion. The main valve has a sleeve, H, which surrounds the stem F, and also extends out through the casing, having a rocker-arm keyed to it, by which motion is imparted to the main valve independent of that which is imparted to the cut-off valve.

J is the oil hole or cup through which the bearings are lubricated, and K is an opening through the stem through which the waste may escape. Collars L are placed upon the valve-stems, against which the smaller ends of the valves press to prevent their being forced in too far, so as to stick or run too tight. Any condensed steam is allowed to escape through the recess K in the stem of the main valve to the sleeve of the casing, and no packing is required on the stems. By cutting grooves *a* from the exhaust-cavity a free passage for steam is obtained over the back and ends of the main valve for the purpose of lubrication and prevention of clogging by oil-sediments. Steam is supplied to the interior of the valves through the inlet-opening N.

In order to make a tight joint between the casing and the main valve, a metal packing, O, is fitted into the neck of the steam-inlet, the lower side being formed to fit the shape of the valve. This packing may have rings surrounding it to make a tight joint between itself and the sides of the inlet-passage, while the pressure of steam upon its upper end will hold it down in contact with the main valve, so as to make a tight joint. The main valve has a trunnion, P, which fits in a depression or chamber in the head of the valve-casing, having a packing-ring, Q, to make a tight joint between it and the inside of the chamber. The cut-off valve has a trunnion, R, fitting into an opening within the trunnion of the main valve, and having a packing-ring, S, by which a tight joint is made at this point. Through the center of the trunnion R a hole is made, through which steam is allowed to pass into the recess T in the head of the valve-casing, behind the ends of the trunnions, as shown. The pressure of this steam against the ends of the trunnions will force the valves against the collars at their smaller ends, and will be sufficient to overcome the tendency of the valves to leave their seats or to move in the direction of the larger ends on account of their taper.

Having thus described my invention, what I claim as new, and desire to secure by Letters Patent, is—

1. A rotary main valve and a cut-off valve fitting concentrically within each other and within the steam-chest, having inlet and outlet ports, arranged as shown, in combination with a packing let into the neck of the steam-inlet, so that its upper end is exposed to steam-pressure, while its lower end is fitted to the shape of the main valve, substantially as herein described.

2. The rotary tapering main valve and cut-off valve fitted concentrically within one another and within an exterior casing or steam-chest having inlet and outlet ports, as shown, and stems extending from their smaller ends for the attachment of rocker-arms, in combination with trunnions extending into corresponding chambers at the larger ends, and a passage by which steam is admitted into the chamber behind the trunnions, substantially as herein described.

3. The rotary main valve and the cut-off valve fitting concentrically one within the other and within an exterior casing or steam-chest, in combination with openings or passages made around the ends and top of the main valve and communicating with the exhaust-passage, substantially as herein described.

In witness whereof I have hereunto set my hand.

JOHN P. SIMMONS.

Witnesses:
S. H. NOURSE,
J. H. BLOOD.